July 30, 1968 W. J. FLANNIGAN 3,394,797
PACKAGE AND METHOD OF FABRICATING SAME
Filed Oct. 31, 1966
2 Sheets-Sheet 1
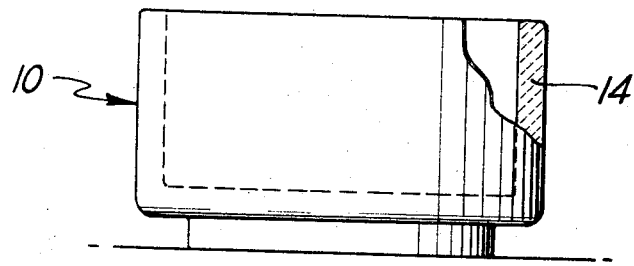
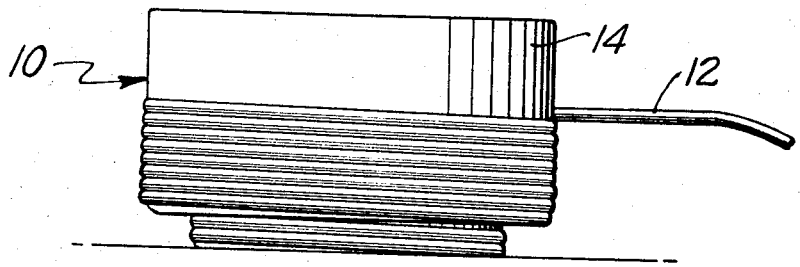
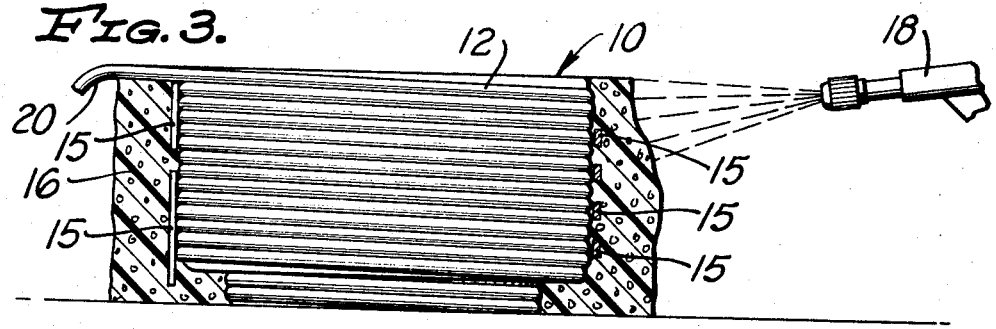
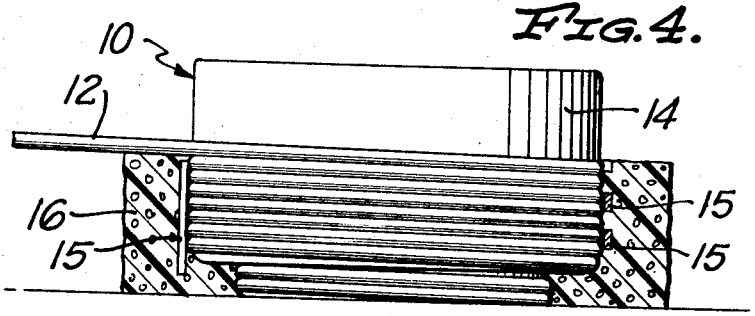
INVENTOR
WILLIAM J. FLANNIGAN
BY
MAHONEY & HORNBAKER
ATTORNEYS July 30, 1968  W. J. FLANNIGAN  3,394,797
PACKAGE AND METHOD OF FABRICATING SAME
Filed Oct. 31, 1966  2 Sheets-Sheet 2
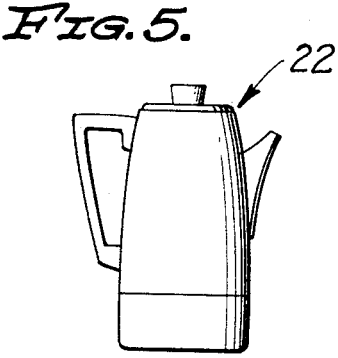
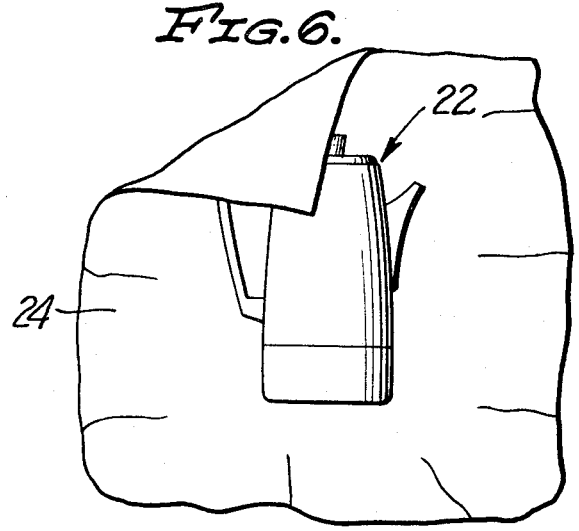
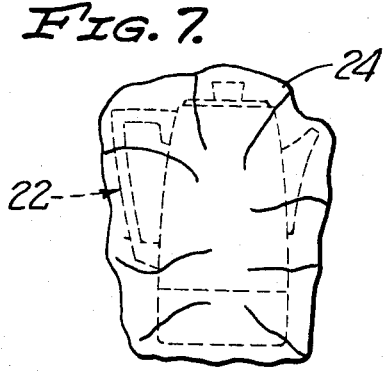
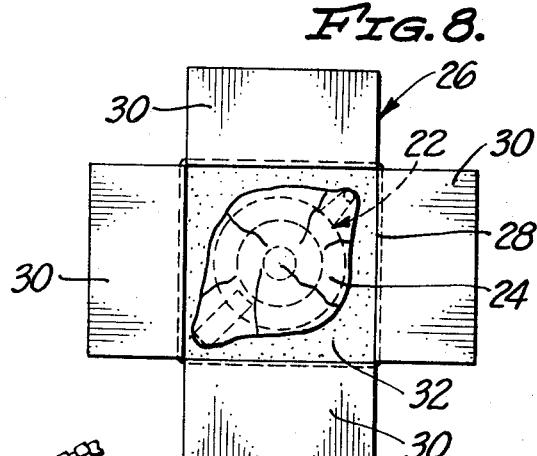
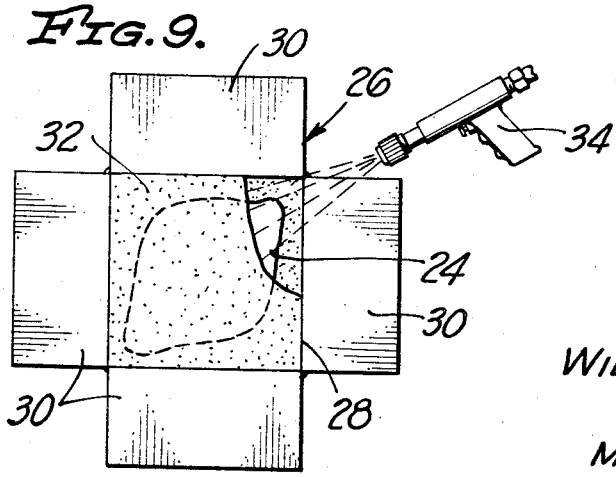
INVENTOR
WILLIAM J. FLANNIGAN
BY
MAHONEY & HORNBAKER
ATTORNEYS

United States Patent Office 3,394,797
Patented July 30, 1968

3,394,797
PACKAGE AND METHOD OF
FABRICATING SAME
William J. Flannigan, Oxnard, Calif., assignor to Architectural Fiberglass, Inc., Oxnard, Calif., a corporation of California
Filed Oct. 31, 1966, Ser. No. 590,979
6 Claims. (Cl. 206—46)

ABSTRACT OF THE DISCLOSURE

At least horizontally exposed sides of an object are wound by at least one continuous strand of nonadhering roving covering said sides. The roving is spray covered by a synthetic plastic foam while a roving terminal end is maintained exposed, so that by grasping said terminal end, the roving may be unwound and will separate and remove the plastic foam. Rigid reinforcing members may be positioned in the plastic foam adjacent the roving. Also, objects may be merely wrapped in a nonadhering flexible covering, placed in a rigid container and the container filled with plastic foam.

---

This invention relates to a unique package and an equally unique method of fabricating said package, and, more particularly, to a package which may be formed simply by providing a cover around the object to be packaged and coating said covered object with a foamed synthetic plastic. Even more particularly, this invention relates to a package of the foregoing character wherein the covering for the object to be packaged may be either a continuously connected strand of roving, such as fibrous or otherwise, wound around the object to be packaged to exteriorly cover the same, or may be conventional sheet-like material, such as paper, substantially enclosing the object to be packaged, and in either case, if desirable, the covered object with the foamed synthetic plastic coating may be enclosed in a conventional rigid container. The form of the package with the covering of wound roving is particularly adapted for use in packaging relatively large objects, such as large fiber glass or ceramic objects for shipment, whereas the form of the package in which the object covering is sheet-like material is particularly adapted for packaging relatively small objects, such as small electrical appliances and the like for shipment.

One of the major considerations in manufacturing of various forms of articles, both large and small, is the requirement that the manufactured article must be packaged after manufacture for safe shipment to the distributors and customers, and it is well known that the cost of such packaging can be an important factor in the overall cost of the manufactured articles to the customer. With relatively large articles, such as large fiber glass or ceramic objects and the like, the packaging has conventionally taken the form of wooden framework built around the object and designed for giving sufficient structural support thereto during loading, shipment and unloading. In the case of relatively small articles, such as electrical appliances, the packaging has conventionally taken the form of pasteboard containers having specifically cut and shaped partition members therein to provide the support for the article and prevent damage thereto during such shipment.

Another factor of consideration and important to the cost factors involved in use of certain forms of the principles of the present invention is the fact that various forms of synthetic fiber roving used in many industries for manufacturing materials are deceived by the manufacturer in large quantities wound on large spools or rolls, and there is an appreciable amount at the end of each spool or roll which cannot be used and is considered waste. Such end strands of the fibrous roving are in relatively short lengths and not of a form which is desirable for use in any of the manufacturing industries, so that the ends are disposed of in the most economical manner, usually merely by discarding the same. It is possible, therefore, to obtain relatively large quantities of the unused roving ends for an extremely nominal cost.

It is an object of my invention, therefore, to provide a package and method of fabricating the same wherein the cost of the materials for providing the same, as well as the labor cost in the fabrication thereof, are both relatively low as compared to packages and packaging methods heretofore used and discussed above. Where the package is of the form using a wound covering of fibrous or monofilament roving, such as the roving formed of synthetic fibers, the roving ends normally considered as scrap by other manufacturing industries may be used. Furthermore, the methods of fabricating the various forms of the present invention are extremely simple in nature, not requiring special skills and capable of being performed in a minimum amount of time with the use of conventional equipment so that no special equipment costs are involved.

It is a further object of my invention to provide a package and method of fabricating the same having the foregoing economical attributes wherein the articles or objects being packaged are provided with the necessary structural strengthening and protection required to guard the articles or objects during the various shipping and transportation procedures. After the objects to be packaged are covered with either the wound roving or the conventional sheet-like material, the covered objects are coated with a liberal layer of foamed synthetic plastic, such foamed synthetic plastic providing the covering of the object with the required stiffening and padding to provide the additional structural strength for the object, as well as the cushioning therefor, during shipment. Also, the covered object prior to coating with the foamed synthetic plastic may be placed in a conventional rigid carton or container so that during the coating with the foamed synthetic plastic, such foamed synthetic plastic will fill the space between the covered object and the side walls of the container, resulting in a final package of maximum object protection.

It is still a further object of my invention to provide a package and method of fabricating the same wherein the object being packages may be removed from such package after shipment quickly and simply and without any adherence of packaging material to the object so as to not require further cleaning as a result of such packaging. Where the ultimately coated covering for the object is in the form of the wound roving, the roving is originally provided as a continuously connected single strand and after forming the covering by winding the roving around the object, the terminal end of the roving may be maintained in an exposed accessible position, even after the foamed synthetic plastic coating operation. Thus, after the object shipment has been completed and it is desired to remove the object from the package, it is merely necessary to grasp the roving terminal end and unwind the roving from the object, the foamed synthetic plastic coating being of a character which will separate during such roving unwinding so that upon completion of the unwinding of the roving, both the roving and coating will be cleanly removed from the object.

It is an additional object of my invention to provide a package and method of fabricating the same of the foregoing general character with which, when the final package includes the previously discussed enclosing rigid container, such as a pasteboard container, no special partition members are required for supporting the object within the container so that the package and packaging method are completely versatile without added expense. With this container enclosing form of the present invention, the covered object is merely placed in the rigid container and the foamed synthetic plastic coating formed in the container around the covered object in sufficient quantity to substantially fill the container and provide the cushioning wall between the covered object and the container sidewalls. The particular configuration of the object to be packaged, therefore, is without importance and need not be considered, since the foamed synthetic plastic will inherently fill the container around the covered object despite the particular configuration thereof.

Other objects and advantages of the invention will be apparent from the following specification and the accompanying drawings which are for the purpose of illustration only, and in which:

FIG. 1 is a side elevational view of a representative fiber glass or ceramic object which may be packaged according to certain of the principles of the present invention;

FIG. 2 is a view similar to FIG. 1, with the object partially covered with wound roving illustrating the object covering step;

FIG. 3 is a view similar to FIG. 1, showing the object exteriorly covered by the wound roving and a foamed synthetic plastic coating being sprayed thereon to complete the package fabrication;

FIG. 4 is a view similar to FIG. 1, showing the wound and coated roving being unwound from the object for removal of the object from the package;

FIG. 5 is a side elevational view of a representative small electrical appliance which may be packaged according to certain of the principles of the present invention;

FIG. 6 is a view similar to FIG. 5 and showing the appliance being covered with a sheet-like covering, such as paper;

FIG. 7 is a view similar to FIG. 5 and showing the appliance completely covered and preparatory to the coating step;

FIG. 8 is a top plan view showing the covered article positioned in a rigid container, such as a pasteboard container and preparatory to the final foamed synthetic plastic coating step; and FIG. 9 is a view similar to FIG. 8, showing the final foamed synthetic plastic coating step.

Referring to FIGS. 1 through 4 of the drawings, the object to be packaged according to the principles of the present invention is shown as a relatively large plant container or urn, generally indicated at 10, said container being formed of any of the usual materials, such as ceramic or fiber glass reinforced plastic, and having dimensions perhaps in the order of three or six feet in lateral diameter and several or more feet in height. It is pointed out that it is not intended to limit the principles of the present invention to the particular packaged objects illustrated, but rather, such principles are applicable to virtually any objects of virtually any size, configuration and material, for instance, any of the usual objects and articles found both interiorly and exteriorly around the modern household. The particular principles of the present invention illustrated in FIGS. 1 through 4, however, are particularly advantageous for use with the larger objects wherein the normal pasteboard cartons are not conventionally used.

To begin fabrication of the package, a continuously connected strand 12 of roving, preferably formed from extruded synthetic or other types of fibers, such as the conventional fiber glass, or conventional hemp twine and rope, is wound continuously laterally around the plant container 10 in the manner shown in FIG. 2 and until the container is substantially totally exteriorly covered at sides 14 thereof. The strand of roving 12 may be formed of end connected relatively short lengths of said roving obtainable as scrap from manufacturers using large quantities of said roving and received wound on drums or spools (not shown), as hereinbefore discussed. Furthermore, the end connection of the relatively short lengths to ultimately form the continuously connected strand 12 may be accomplished by tying or otherwise fastening said short lengths in any conventional manner and depending on the particular composition thereof.

After completion of the lateral wind wrapping of the plant container 10 by the roving strand 12, stiffening members 15 formed of any usual material, such as wood or stiff cardboard, may be positioned both vertically and horizontally against the roving and the covering formed by the roving and stiffening members coated with a liberal layer 16 of foamed synthetic plastic. The foamed plastic is preferably polystyrene or polyurethane, and is preferably applied by spraying from a nozzle 18, as shown in FIG. 3. During the final stages of the lateral winding or wrapping the roving strand 12, a terminal end 20 thereof may be left outwardly exposed so that such end may project outwardly to close to or through the layer of coating 16. Thus, during unpackaging of the plant container 10 after the shipment thereof has been completed and the package has served its useful purpose, it is merely necessary to grasp the terminal end 20 of the roving strand 12 and commence unwrapping the same, as shown in FIG. 4, with the layer of coating 16 with the stiffening members 15 separating to permit such unwrapping and completely uncover the plant container.

Obviously, the application of the layer of coating 16 to the wound roving strand 12 with or without the stiffening members 15 will stiffen such roving strand and provide structural stiffening and strengthening for the enclosed plant container 10. Also, the roving strand 12 will completely laterally cover the plant container 10, with nonadherence thereto, so that upon the unwinding of the roving strand from the container, both the roving strand and the layer of coating 16 will be stripped cleanly from the container and there will be no necessity for cleaning of the container as a result of such packaging. At the same time, during shipment of the package, as described, the layer of coating 16 being a foamed synthetic plastic will not only structurally strengthen the plant container 10 during shipment, but will also cushion the same.

A second form of the package and method of the present invention is shown in FIGS. 5 through 9 wherein a representative small object to be packaged in the form of a small electrical appliance, generally indicated at 22, is shown separately in FIG. 5 prior to packaging thereof. The small appliance 22 is covered by wrapping therearound a conventional sheet-like cover 24 which may be paper or the like, and having nonadherence to the small appliance, said initial wrapping being shown in FIG. 6. Upon completion of said wrapping by the cover 24, the small appliance 22 is preferably completely enclosed and the cover is merely folded over or bunched at the top to complete such covering, as shown in FIG. 7.

Next, the small appliance 22 enclosed by the cover 24 is inserted in a usual rigid container 26 having sidewalls 28, preferably spaced laterally from the covered small appliance, as shown in FIG. 8. The rigid container 26 may be a usual pasteboard container, with the covered appliance being inserted therein from the top, with top flaps 30 of the container open. Finally, foamed synthetic plastic coating 32 is sprayed from a conventional spray nozzle 34 through the top of the rigid container 26 and laterally around and substantially enclosing the cover 24 and the small appliance 22 so as to substantialy fill the container, with the completion of the packaging merely being the conventional folding and closing of the container top flaps 30, the spray filling of the container with the foamed coating being shown in FIG. 9.

Again, therefore, according to the principles of the present invention, the foamed coating 32 over the cover 28 of the small appliance 22 will provide rigidity for said cover, as well as structural strength and stiffening for the small appliance, this being augmented by the rigid container 26. In view of the addition of the rigid container 26, the wrapped small appliance 22 is virtually totally enclosed by the combined foamed coating 32 and the container. For unpackaging the small appliance 22 after the package has served its useful purpose during shipment, it is merely necessary to strip away sufficient of the foamed coating 32 to grasp a portion of the cover 24, pulling the same away from the enclosure of the appliance, such separation being extremely easy and simple in view of the nonadherence between the appliance and the cover.

Thus, I have provided, according to the principles of the present invention, a package and method of fabricating the same which is extremely simple in nature and the various required procedural steps capable of being carried out by virtually anyone without special skills. Furthermore, the provision of such package is relatively inexpensive and greatly reduces the packaging costs of various types of objects from those heretofore required with the prior packages and package methods. At the same time, I have provided a package and method of fabricating the same which fully protects the object being packaged, supplying the additional usual structural strength to the object supplied by the prior packaging materials, as well as a cushioning coating layer serving to fully protect the packaged object.

As used herein and in the appended claims, the term "roving" is intended to mean conventional roving, whether plastic or natural materials, and all mechanical and chemical equivalents thereof. Obviously, said roving may be multifiber or monofilament, a continuous or end connected strip, or may be fiber glass, twine or common ropes, all fully contemplated within the term "roving" according to the principles of the present invention.

Furthermore, in the first form of package described, the stiffening members 15 may or may not be added to the foamed layer 16, depending on the size of the object being packaged, and whether or not additional stiffening is desired. In any event, the stiffening members 15 in the first form serve a similar purpose to the container 26 in the second form and that is one of strengthening the foamed layer and preventing inadvertent separation thereof.

I claim:

1. In a package for objects, the combination of: at least one layer of at least one continuously connected strand of roving wound around said object, said roving substantially completely covering at least horizontally exposed sides of said object and having a terminal end projecting outwardly away from said object, said roving being formed of a material substantially free of adherence to said object; and an exterior coating of foamed synthetic plastic over said roving stiffening and retaining said roving in said wound condition and structurally strengthening said object, said roving terminal end being exposed through said plastic coating, said plastic coating being of a thickness and foamed consistency permitting separation of said plastic coating upon a force being applied to said roving exposed terminal end tending to unwind said roving from said object.

2. A package for objects as defined in claim 1 in which said roving is continuously spirally wound with each wind abutting an adjacent wind substantially completely covering said object sides.

3. A package for objects as defined in claim 1 in which rigid stiffening members are positioned outwardly adjacent said roving layer and at least partially surrounded by said plastic coating adding additional stiffening to said plastic coating.

4. A package for objects as defined in claim 1 in which said roving is continuously spirally wound with each wind abutting an adjacent wind substantially completely covering said object sides; and in which rigid stiffening members are embedded in said plastic coating adding additional stiffening to said coating.

5. In a method of packaging objects, the steps of: winding at least one continuously connected strand of roving around at least horizontally exposed sides of an object substantially completely covering said object sides; during said winding, maintaining said roving substantially nonadhering to said object sides; spraying said wound roving with a foamed synthetic plastic providing a thickened coating over said wound roving; during said spraying of said foamed plastic, maintaining a terminal end of said wound roving exposed outwardly of said coating; during said spraying of said foamed plastic, maintaining the thickness of said foamed plastic coating sufficient to produce stiffening of said wound roving upon the setting of said foamed plastic while still permitting separation of said foamed plastic coating upon a force being applied to said wound roving exposed terminal end tending to unwind said wound roving from said object; and permitting said foamed plastic coating to set, stiffening said wound roving and structurally strengthening said object.

6. A method as defined in claim 5 in which said method includes the step of: during said spraying of said foamed plastic coating, placing rigid stiffening members exteriorly adjacent said wound roving and embedded in said sprayed foamed plastic to further structurally strengthen said object.

References Cited

UNITED STATES PATENTS

| Re. 24,767 | 1/1960 | Simon et al. | 206—46 |
| 1,582,242 | 4/1926 | Booty. | |
| 2,895,603 | 7/1959 | Freeman | 206—46 |
| 3,029,932 | 4/1962 | Layne | 206—46 |
| 3,124,246 | 3/1964 | De Remer et al. | |

MARTHA L. RICE, *Primary Examiner.*